United States Patent [19]

Mine et al.

[11] Patent Number: 5,287,277
[45] Date of Patent: Feb. 15, 1994

[54] METHOD AND APPARATUS FOR CONTROLLING HEIGHT OF A VEHICLE

[75] Inventors: Atsushi Mine; Katsuyoshi Kamimura; Yutaka Hiwatashi, all of Tokyo, Japan

[73] Assignee: Fuji Jukogyo Kabushiki Kaisha, Tokyo, Japan

[21] Appl. No.: 74,167

[22] Filed: Jun. 9, 1993

Related U.S. Application Data

[63] Continuation of Ser. No. 963,016, Oct. 19, 1992, abandoned, which is a continuation of Ser. No. 470,768, Jan. 26, 1990, abandoned.

[30] Foreign Application Priority Data

Feb. 3, 1989 [JP] Japan .................................. 1-25300
Feb. 8, 1989 [JP] Japan .................................. 1-29476

[51] Int. Cl.$^5$ .......................................... B60G 17/015
[52] U.S. Cl. ............................ 364/424.05; 280/707; 280/840
[58] Field of Search ............... 364/424.05; 280/688, 280/640, 707, 840, 6.1, 6.11, 6.12

[56] References Cited

U.S. PATENT DOCUMENTS

| | | | |
|---|---|---|---|
| 4,787,644 | 11/1988 | Yokote et al. ................. | 280/6 R |
| 4,821,191 | 4/1989 | Ikemoto et al. ............... | 364/424.1 |
| 4,903,209 | 2/1990 | Kaneko ........................ | 364/424.05 |
| 4,924,393 | 5/1990 | Kurosawa .................... | 364/424.05 |
| 4,934,732 | 6/1990 | Fukunaga et al. ............ | 280/707 |
| 4,948,166 | 8/1990 | Kaneko ........................ | 280/707 |

FOREIGN PATENT DOCUMENTS 62-139709  6/1987  Japan .

*Primary Examiner*—Thomas G. Black
*Assistant Examiner*—Collin W. Park
*Attorney, Agent, or Firm*—Beveridge, DeGrandi, Weilacher & Young

[57] ABSTRACT

In a motor vehicle having a vehicle height adjusting device, wherein the height of each suspension is controlled so as to attain a set reference vehicle height, reaction forces of respective suspensions are detected and a difference between the detected reaction forces is calculated according to a formula, while the vehicle is stationary or is being driven straight. When the difference exceeds a predetermined value, it is determined that there are imbalances of the road surface contact loads of the wheels. Upon the determination of imbalances, the reference vehicle height is increased for some suspensions and decreased for other suspensions to eliminate the imbalances. The determination of imbalances is made when a value given by a formula including the integrated values for the suspensions exceeds a predetermined value, and then reference vehicle height is increased and decreased for the suspensions to eliminate the imbalances.

19 Claims, 7 Drawing Sheets

METHOD AND APPARATUS FOR CONTROLLING HEIGHT OF A VEHICLE

This application is a continuation of application No. 07/963,016, filed Oct. 19, 1992, now abandoned which application is entirely incorporated herein by reference which is a continuation of application application No. 07/470,768 filed Jan. 26, 1990, now abandoned.

BACKGROUND OF THE INVENTION

The present invention relates to a method of and an apparatus for controlling height of a vehicle having a vehicle height adjusting device.

Conventional motor vehicles are known that have a vehicle height adjusting device to control the height of a vehicle to zones such as high, medium or low. Motor vehicles are also known that monitor the vehicle height at a high resolution (such as in millimeter units, for example) and that independently adjust the height for each of the four wheels. Such vehicles are disclosed in Japanese Patent Laid-Open No. 139709/1987.

In motor vehicles provided with suspension stroke sensors to detect the up-and-down relative displacement or stroke of the suspension units of each of the four wheels, suspension stroke information detected by each of the suspension sensors is used as the basis for performing vehicle height control independently for each of the suspension units. In this type of vehicles that has an active suspension, each suspension unit operates to achieve control to be in agreement with a reference vehicle height when there is a vehicle distortion or skewing, or when the degrees of wear of the tires are different. This causes imbalances between the contact loads of the wheels with the road surface.

As will be described later in detail with reference to he drawings, when the vehicle body is distorted, the suspension units of the left and right front wheels and the left and right rear wheels operate to cause the suspension lengths to take a set value or a reference vehicle height, so that whether the vehicle is running or stationary, the contact loads of one pair of diagonally opposite wheels are increased and the contact loads of the other pair of diagonally opposite wheels are decreased.

If an imbalance in the contact loads occurs as described above, the vehicle will become unstable and will tend to tilt with respect to a line connecting the points of contact with the road surface, of the diagonally opposing pair of wheels for which the suspension units are contracted.

Such an imbalance of the contact loads of the wheels occurs not only when there is distortion or skewing of the vehicle body and when there is tire wear, but also when there is deformation in the sensor links of the suspension stroke sensors, and when the vehicle stops on a distorted road surface.

SUMMARY OF THE INVENTION

The object of the present invention is to solve these problems and to provide a method of and an apparatus for controlling the vehicle height so that a good balance is maintained between the contact loads of the wheels in various conditions of the vehicle.

According to the present invention, in one aspect thereof, there is provided a method of controlling a height of a vehicle having vehicle height adjusting means, wherein strokes of wheel suspensions are detected and the height is controlled responsive to the detected strokes so as to attain a reference vehicle height independently for each suspension, said method comprising the steps of: obtaining quantities concerning the operation of the respective suspensions; calculating an amount representing a degree of imbalances among contact loads of the wheels when the condition of the vehicle is stationary or is driving straight; determining whether said amount exceeds a predetermined value; and changing the reference vehicle height for at least two of the suspensions when it is determined that said amount exceeds the predetermined value.

According to the present invention, in another aspect thereof, there is provided an apparatus for controlling height of a vehicle, having vehicle height adjusting means for each of front and rear wheels, and a controller responsive to strokes of suspensions for the wheels for controlling the height of the vehicle so as to attain a reference vehicle height independently for each suspension, said apparatus comprising: means for obtaining quantities representing states of operation of the respective suspensions; calculating means responsive to the quantities for calculating an amount representing a degree of imbalances among contact loads of the wheels while the vehicle is stationary or is being driven straight; imbalance determining means responsive to the amount for determining whether there are imbalances of the contact loads of the wheels; and reference vehicle height changing means responsive to a signal from said calculating means, indicating that there are imbalances, for changing the reference vehicle heights for at least two of the suspensions.

Preferred embodiments of the present invention will become understood from the following detailed description referring to the accompanying drawings.

DESCRIPTION OF THE PREFERRED EMBODIMENT

Figure 1:
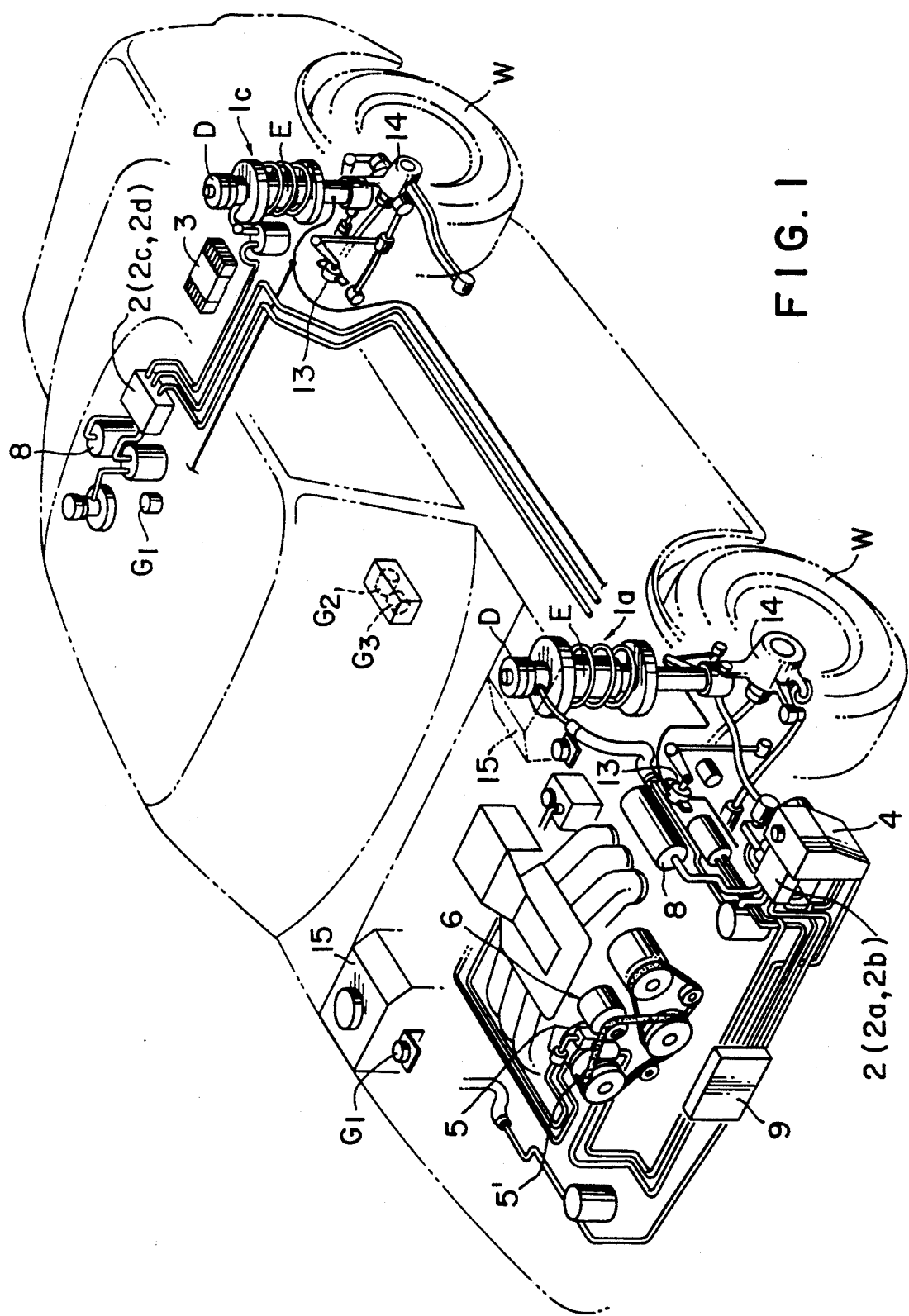
FIG. 1 is a schematic perspective view showing a vehicle suspension system for a vehicle according to the present invention.
Figure 2:
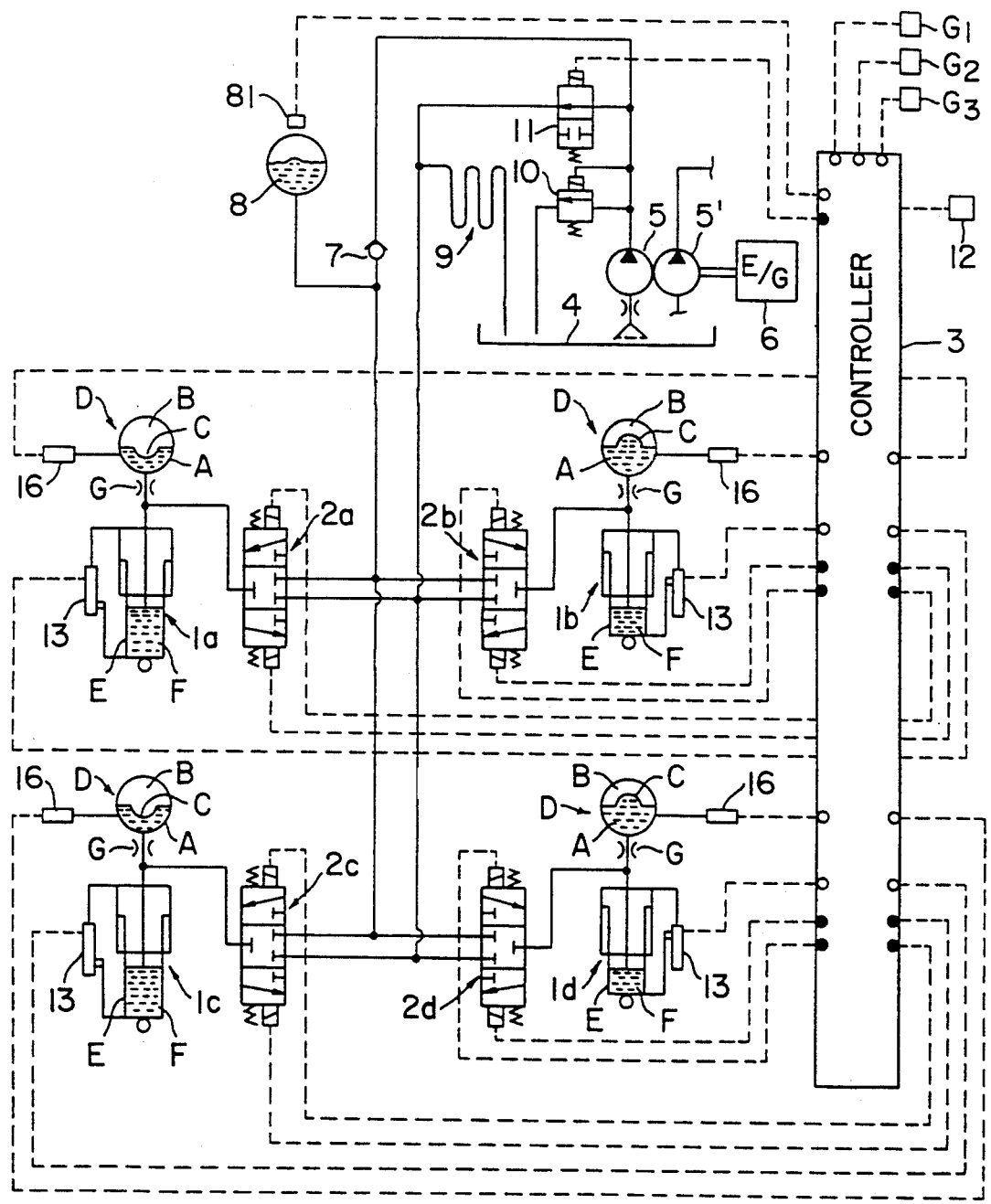
FIG. 2 is a hydraulic circuit diagram showing the vehicle height adjusting system of FIG. 1.

FIGS. 1 and 2 show an active suspension system to which the present invention may be applied. In FIG. 2, reference characters 1a and 1b indicate suspensions of the left and right front wheels of a motor vehicle, and 1c and 1d indicate suspensions of left and right rear wheels. Each of the suspensions 1a, 1b, 1c and 1d is provided with a pneumatic spring portion D and a hydraulic cylinder E. The spring portion D has an oil chamber A and an air chamber B which are divided by a diaphragm C. The oil chamber A of the spring portion D and an oil chamber F of the hydraulic cylinder E are communicated through an orifice G. As shown in FIG. 1, one end of the hydraulic cylinder E (such as a bottom portion of the cylinder) is connected to a suspension arm member 14 on the vehicle wheel W, and the other end (a piston rod) of the hydraulic cylinder E is connected to a member 15 of the vehicle chassis. In accordance with the load on the cylinder E, hydraulic oil in the oil chamber F flows into and out of the oil chamber A through the orifice G so as to generate an appropriate damping force and at the same time to produce a spring action by the volumetric elasticity of the air sealed in the air chamber B. The system described above is a known hydropneumatic suspension system.

There are provided control valves 2a, 2b, 2c and 2d that supply and discharge oil to and from the oil chambers F of the hydraulic cylinders E. These control valves 2a, 2b, 2c and 2d are operated independently by a valve drive signal from a controller 3 to be described later. In FIG. 1, the control valves 2a, 2b, 2c and 2d are installed separately in two groups for the front and rear suspension units.

An oil pump 5 is driven by an engine 6 to pump up oil from an oil reservoir 4 to the system. In the system shown, an oil pump 5' for power steering and the oil pump 5 described above are driven in tandem by the engine 6.

The oil discharged from the oil pump 5 passes through a check valve 7 and is stored in a high-pressure accumulator 8. In FIG. 1, the accumulator 8 is shown to be divided into two sections for the front and rear suspension units. When, some of the control valves 2a, 2b, 2c and 2d are switched to the intake side, high-pressure oil is supplied through the control valves that have been switched to the intake side, to the corresponding oil chambers F of the suspension units 1a, 1b, 1c and 1d. When some of the control valves 2a, 2b, 2c and 2d are switched to the discharge side, oil is discharged from the oil chambers F of the suspension units 1a, 1b, 1c and 1d and the oil passes through an oil cooler 9 to flow into the oil reservoir 4.

FIG. 2 shows a relief valve 10 and a valve 11 which is switched to the unload state indicated in the figure, when signals, generated by the controller 3 responsive to a signal from a pressure sensor 81, indicate that the high-pressure accumulator 8 has attained a predetermined pressure. When the valve 11 is switched to the unload side, the oil discharged from the oil pump 5 flows to the oil cooler 9 and then into the oil reservoir 4.

The suspension units 1a, 1b, 1c and 1d are provided with suspension stroke sensors 13 as shown in FIGS. 1 and 2. The sensor 13 detects up and down relative displacement for each suspension unit between the wheel and the vehicle body and input the information of detected up and down relative displacement to the controller.

In order to detect behaviors of the vehicle, there are provided a vertical G-sensor $G_1$ to detect vehicle vertical acceleration (vertical G), a lateral G-sensor $G_2$ to detect vehicle lateral acceleration (lateral G) and a longitudinal G sensor $G_3$ to detect vehicle longitudinal acceleration (longitudinal G). The positions where the G-sensors $G_1$, $G_2$ and $G_3$ are installed are as indicated in FIG. 1. Signals of the sensors $G_1$, $G_2$ and $G_3$ are inputted to the controller 3. Responsive to the input, the controller 3 determines control quantity for the charging and discharging of oil for each suspension unit, sends valve drive signals to the respective control valves 2a, 2b, 2c and 2d, and thus controls the charging and discharging of oil to each suspension units.

Signals from the suspension stroke sensors 13 pass through a circuit having a dead zone so that the signal within a set range in the vicinity of zero are excluded. When the vehicle height is selected by a height switch 12 between a low and a high vehicle height for running on rough road, a signal exceeding the set range may be input from the stroke sensors 13 to the controller 3. Then the controller 3 supplies oil to a pair of the suspension units which are more contracted than the reference vehicle height and discharges oil from the other pair of the suspensions which are more extended than the reference vehicle height, so that the vehicle height is maintained at the vehicle reference height.

The signals from the vertical G-sensor $G_1$, the lateral G-sensor $G_2$ and the longitudinal G-sensor $G_3$ pass through the respective dead zone circuits, and signals in the vicinity of zero are excluded. When the signal from the vertical G-sensor $G_1$ exceeds the set range, oil is discharged from the suspension units for an upward acceleration and is supplied to the suspension units for a downward acceleration. Therefore, the suspension has a soft suspension characteristic with a high degree of attenuation with respect to vibrations below the suspension unira, and a hard suspension characteristic for the movement of the vehicle body above the suspension units by the control based on the signals of the suspension stroke sensors 13. With respect to the signals exceeding the set range, from the lateral G-sensor $G_2$ and the longitudinal G-sensor, $G_3$, the controller 3 performs control for the charging and discharging of oil to and from each of the suspension units so that the rolling, squating and nose-diving and other undesirable movements of the vehicle are reduced which occur accompanying the turning, acceleration and/or deceleration of the vehicle.

Figure 3:
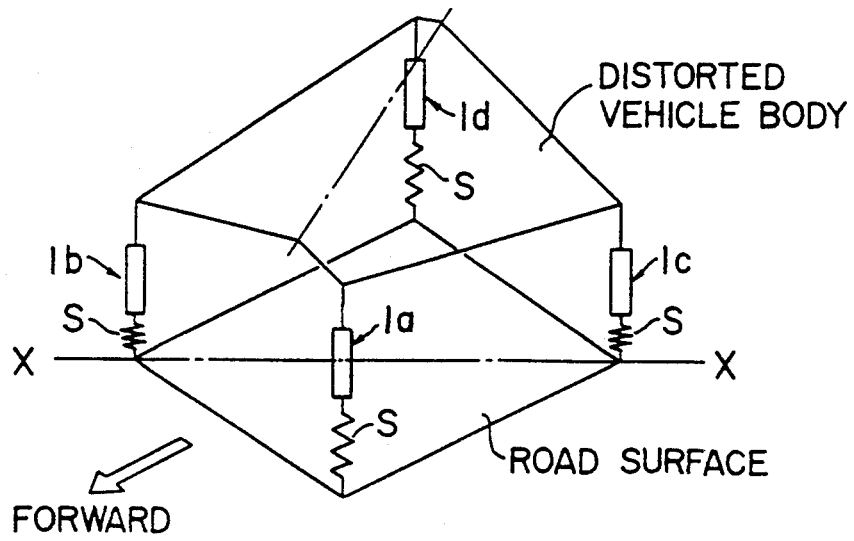
FIG. 3 is a diagrammatic perspective view for a model description of the states of extension and contraction of the suspensions when the vehicle body is distorted or skewed.

In the active suspension system as described above, control is carried out to maintain the vehicle height at reference height based on the signals from the suspension stroke sensors 13, so that imbalance in the contact load of the tires occurs when there is vehicle distortion as indicated in FIG. 3, with the road surface for example.

When there is the vehicle distortion as shown in a model diagram of FIG. 3, the suspension units 1a and 1b for the left and right front wheels, and the suspension units 1c and 1d for the left and right rear wheels have their suspension lengths maintained to the set values, so that regardless of whether the vehicle is stationary or running, the tires of the right front wheel and the left rear wheel have their contact load increased, and the tires of the left front wheel and the right rear wheel have their contact load reduced. In FIG. 3, elasticity of the tires is represented by the spring S, and the tires with the larger contact load are contracted and tires with the smaller contact load are extended.

When imbalance of the contact load occur as described above, the vehicle body tends to tilt about the line X—X linking the points of contact with the road surface of tires for which the suspension units are contracted, and then the vehicle becomes unstable.

The phenomena described above likewise occur where there are differences in the wear of the tires, and deformation of the sensor links of the suspension stroke sensors, and where a deviation occurs due to sensor failure. The phenomena also occur when the vehicle is stationary on a distorted road surface.

As shown in FIG. 2, in the embodiment of the present invention, each of the suspension unit 1a, 1b, 1c and 1d is provided with a suspension reaction force detector 16 to detect the suspension reaction force of each suspension units. A pressure sensor is generally used for detecting the internal hydraulic pressure of each suspension unit as the suspension reaction force detector 16. However, in the case of active suspension using the control valves 2a, 2b, 2c, and 2d which control pressure in the suspension units, it is also possible to detect each suspension reaction force according to a command signal to the pressure control valve.

The information of each suspension reaction force detected for each suspension unit is input to the controller 3. The controller 3 calculates a mean value of the suspension reaction force during 1 to 2 seconds (a time a little longer than the cycle time of the natural vibration of the vehicle body) when the vehicle is either stationary or being driven straight ahead. These conditions are detected by the lateral G-sensor $G_2$. Another method is that the signal from the detector 16 input to the controller 3 is passed through a low-pass filter having a cutoff frequency at a value higher than the natural frequency of the vehicle body. The mean value above or the value passed through the low-pass filter is used as a basic suspension reaction force $\overline{P_{FL}}$, $\overline{P_{FR}}$, $\overline{P_{RL}}$ or $\overline{P_{RR}}$ for the left right, right front, left rear or right rear wheels, respectively. On the basis of these reaction forces, the controller 3 calculates and determines the suspension reaction force difference $\Delta P$ using either one of the following formulae (1), (2) and (3) indicated below.

$$\Delta P = (\overline{P_{FR}} + \overline{P_{RL}}) - (\overline{P_{FL}} + \overline{P_{RR}}) \cdots \quad (1)$$

$$\Delta P = (\overline{P_{FR}} \div \overline{P_{FL}}) - (\overline{P_{RR}} \div \overline{P_{RL}}) \cdots \quad (2)$$

$$\Delta P = (\overline{P_{FR}} \div \overline{P_{RR}}) - (\overline{P_{FL}} \div \overline{P_{RL}}) \cdots \quad (3)$$

Figure 5:
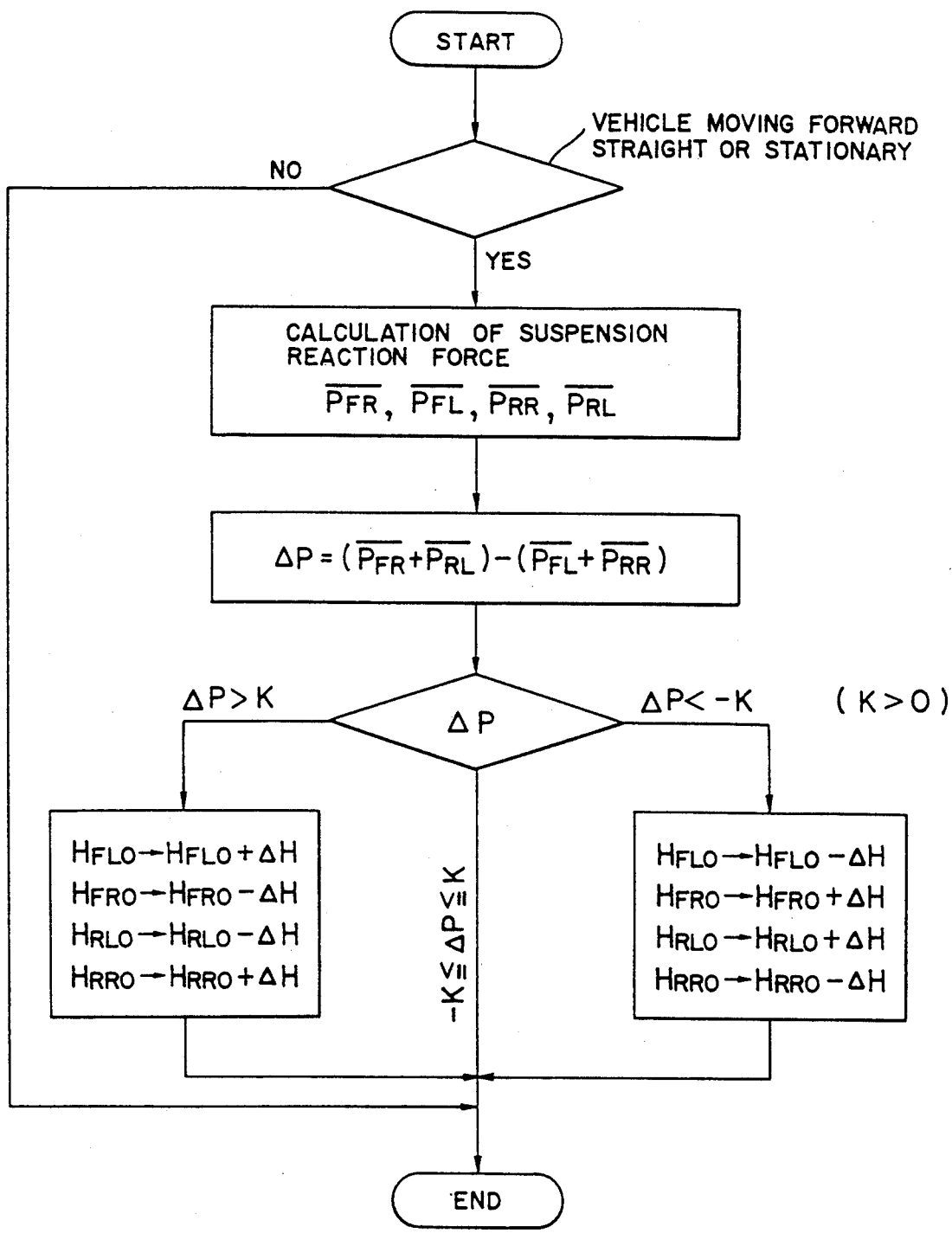
FIG. 5 is a flow chart of the control according to the first embodiment of the invention.

The flow chart of FIG. 5 shows an example of using the formula (1).

Then, when the value of $\Delta P$ exceeds a set allowable value K, the controller 3 determines that there is an imbalance in the contact loads for the wheels due to an abnormality such as differences in the sensing of the suspension stroke sensors, differences in the tire wear, or skewing of the vehicle. Thereupon, the controller 3 operates to change the set reference vehicle heights indicated by $H_{FLO}$, $H_{FRO}$, $H_{RLO}$ and $H_{RRO}$ (same reference heights for the left front, right front, left rear and right rear wheels, respectively) so that vehicle height control (oil charging and discharging control) is performed to attain changed reference vehicle heights compensating for the imbalance.

More specifically, if $\Delta P$ is positive and exceeds the set allowable value K, the controller 3, as shown in FIG. 5,
(A) increases the set reference vehicle height for the left front wheel by $\Delta H(H_{FLO} \to H_{FLO} + \Delta H)$,
(B) decreases the set reference vehicle height for the right front wheel by $\Delta(H(H_{FRO} \to H_{FRO} - \Delta H)$,
(C) decreases the set reference vehicle height for the left rear wheel by $\Delta H(H_{RLO} \to H_{RLO} - \Delta H)$, and
(D) increases the set reference vehicle height for the right rear wheel by $\Delta H(H_{RRO} \to H_{RRO} + \Delta H)$.

Any two or four of the above (A), (B), (C) and (D) are performed simultaneously.

If $\Delta P$ is negative and exceeds the set allowable value K, the controller 3, as shown in FIG. 5,
(a) decreases the set reference vehicle height for the left front wheel by $\Delta H(H_{FLO} \to H_{FLO} - \Delta H)$,
(b) increases the set reference vehicle height for the right front wheel by $\Delta H(H_{FRO} \to H_{FRO} + \Delta H)$,
(c) increases the set reference Vehicle height for the left rear wheel by $\Delta H(H_{RLO} \to H_{RLO} + \Delta H)$, and
(d) decreases the set reference Vehicle height for the right rear wheel by $\Delta H(H_{RRO} \to H_{RRO} - \Delta H)$.

Any two or four of the above (a), (b), (c) and (d) are performed simultaneously.

When the vehicle is moving, the change of the set reference vehicle height is repeatedly performed for a certain set time. The set time is between 2 and 4 seconds when each basic suspension reaction force is determined by the mean value of the suspension reaction forces detected by the suspension reaction force detectors 16, and the set time is approximately twice the time required for taking the mean value when a low-pass filter having a cutoff frequency f is used, i.e., the set time is about 2/f seconds.

Figure 4:
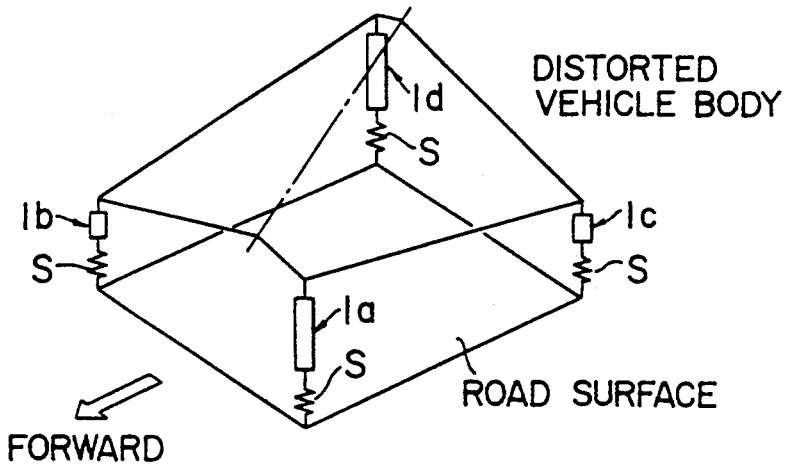
FIG. 4 is a diagrammatic perspective view showing a first embodiment of the present invention.

As shown in FIG. 4, even if there is a skew of the vehicle, the control described above improves the balance of the contact loads of the tires of the wheels as expressed by S, and eliminates unstable states due to the skew and at the same time greatly reduces unnecessary vehicle height control, thus allowing a reduction of the control energy.

When the vehicle stops and the engine and the vehicle height control system also stop, the set reference vehicle height of each suspension unit is stored in a memory backed up by a battery. When the engine is started again, the stored values of the set reference vehicle heights are used as the basis for repeating the control of the vehicle height described above. It is therefore possible to shorten the length of time required for vehicle height control after the engine has been started once again. However, if the set reference vehicle heights are not stored at the stop of the engine, the set reference vehicle height that was initially set is used as the basis for controlling the vehicle height as described above.

The present embodiment is not limited to the application to the suspension system of FIG. 2, but can also be applied to a vehicle height adjusting system that has means (such as a lateral G-sensor or a vehicle speed sensor and a steering angle sensor) for detecting whether the vehicle is either stationary or moving straight ahead. This system detects the suspension stroke of the suspension unit of each wheel and controls height independently for each suspension so that the reference vehicle height is maintained responsive to the information for each suspension.

Figure 6:
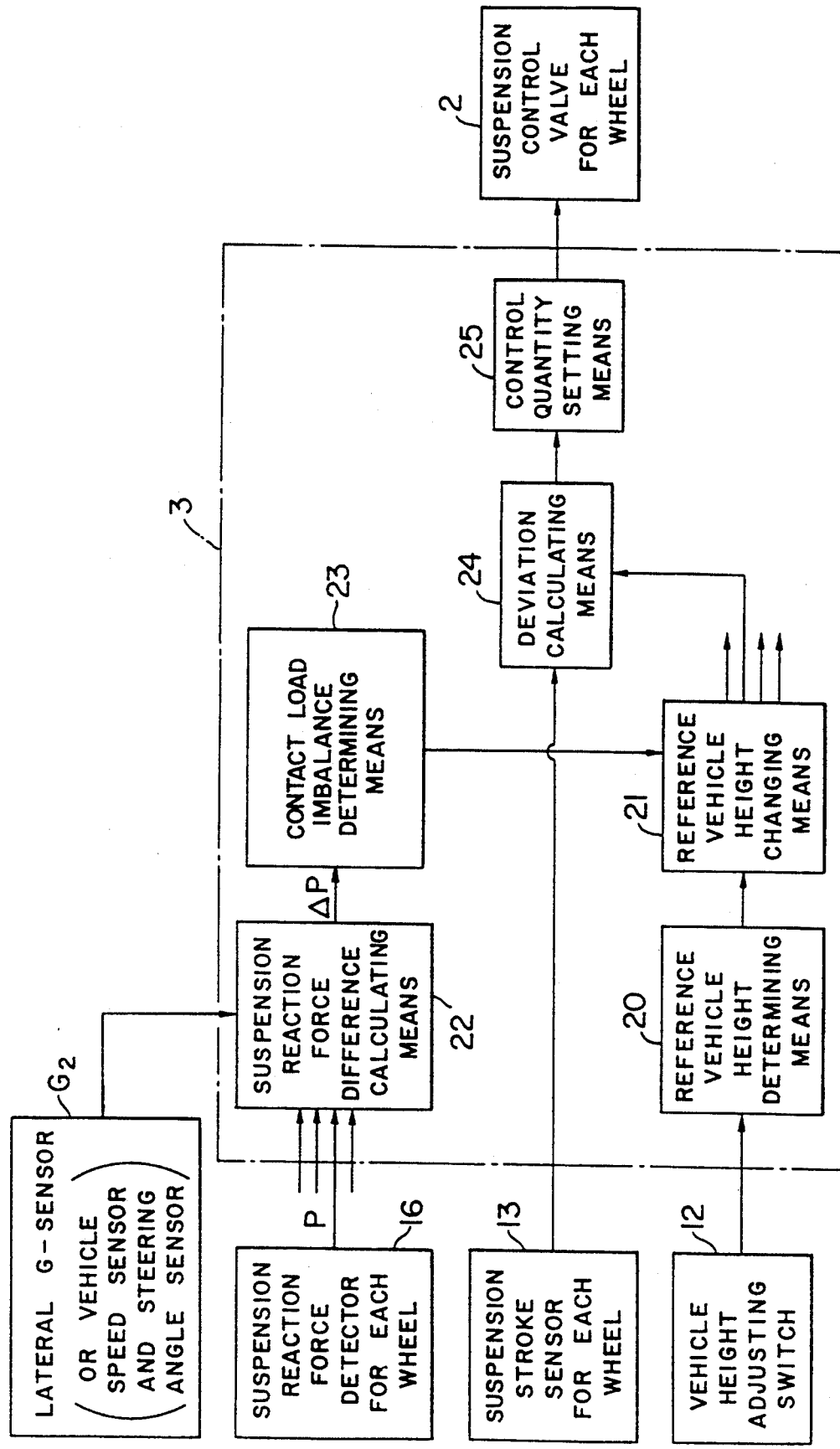
FIG. 6 is a block diagram showing an apparatus according to the first embodiment.

FIG. 6 shows a block diagram of an apparatus for carrying out the vehicle height control described above. As shown, the vehicle height adjusting switch 12 is connected to a reference height determining means 20, which determines the reference vehicle height in response to the operation of the switch 12. The reference vehicle height determining means 20 supplies a reference vehicle height signal to a changing means 21 for changing the reference vehicle height.

The suspension reaction force detector 16 for each wheel delivers suspension reaction force signal to a calculating means 22 for calculating a difference of the suspension reaction force. It will be understood that the calculating means 22 receives signals from the suspension reaction force detectors 16 of all the wheels. The calculating means 22, upon receiving a signal from the lateral G-sensor $G_2$, indicating that the vehicle is stationary or is running straight ahead, calculates the difference $\Delta P$ by using either one of the formulae (1), (2) and (3) set forth hereinbefore. The lateral G-sensor $G_2$ may be replaced by a combination of a vehicle speed sensor and a steering angle sensor. The thus calculated difference $\Delta P$ is inputted to a determining means 23 for determining a contact load imbalance to a road surface. The determining means determines whether the difference $\Delta P$ is positive or negative and whether the difference $\Delta P$ exceeds the set allowable value K.

The determining means 23 supplies an output signal to the reference vehicle height changing means 21 where the reference vehicle height inputted from the reference vehicle height determining means 20 is changed for any two or each of the wheels in accordance with (A), (B), (C) and (D) or with (a), (b), (c) and (d) set forth before.

The reference vehicle height changing means 21 supplies a changing signal of each of the changed reference vehicle heights to a deviation calculating means 24 for each wheel. The deviation calculating means 24 compares the suspension stroke signal from the suspension stroke sensor 13 with the changing signal from the changing means 21 and outputs a deviation signal to a control quantity setting means 25 for one suspension control valve 2 (2a, 2b, 2c or 2d). It is to be understood that the reference vehicle height changing means 21 outputs the changing signal to other like deviation calculating means 24 for the other suspension control valves 2.

As described above, according to the present embodiment, it is possible to eliminate undesirable situations such as vehicle rolling due to imbalance of the tire contact loads, and therefore eliminate the energy consumption for unnecessary vehicle height adjustment due to the vehicle rolling.

A second embodiment of the present invention will be described below.

In order to eliminate the same problem as that of the first embodiment, according to the second embodiment, a detecting means $G_2$ (FIG. 2) is provided for detecting a vehicle straight ahead condition. The detecting means $G_2$ is a lateral G-sensor or a combination of a vehicle speed sensor and a steering angle sensor. The detecting means $G_2$ inputs a detected signal to a controller 3 as shown in FIG. 2.

Figure 7:
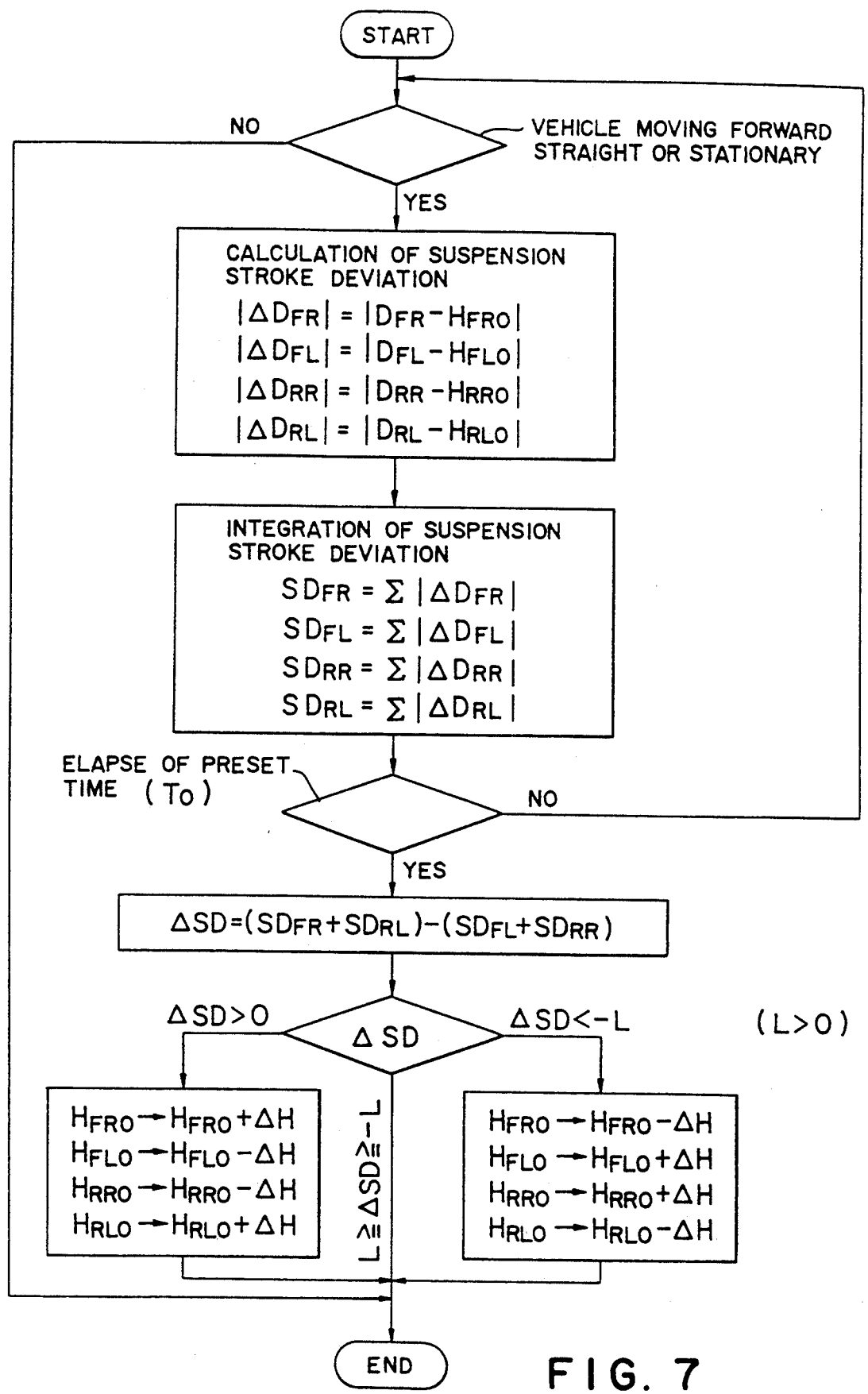
FIG. 7 is a flow chart of the control according to the second embodiment of the invention.

Responsive to the signal input from the detecting means $G_2$, the controller 3 determines that the vehicle is in a condition of moving straight ahead, as indicated in FIG. 7. The signal detected by each of the suspension stroke sensors 13 (FIG. 2) are used to calculate the difference $\Delta D$ of the suspension stroke D from the set reference vehicle height H for each wheel when the vehicle is running straight ahead. Then, the absolute value $|\Delta D|$ for the $\Delta D$ of each suspension unit is integrated with respect to a length of time $T_O$ (set to a value larger than the natural frequency of the vehicle) to obtain a value SD.

The value SD for the respective suspension units does not have a large difference when the contact loads of the tires are approximately the same. But when there is a distortion or skew of the vehicle body as shown in FIG. 3, the contact loads of two diagonally opposite tires are larger than the contact loads of the other two diagonally opposite tires, and the vehicle tends to tilt about the line X—X. As a result, the suspension unit for the wheel with the smaller contact load has a larger vibration of the suspension stroke and the value SD becomes large, while the suspension units with the larger contact load has a smaller variation and the value SD becomes small.

In view of the above, the controller 3 determines the value $\Delta SD$ according to the following formula $$\Delta SD = (SD_{FR} + SD_{RL}) - (SD_{FL} + SD_{RR}) \ldots \quad (4)$$

where $\Delta SD$ is the difference between the sums of the values for the two diagonally opposite pairs of wheels. That is to say, the value $\Delta SD$ is the difference between the sum $SD_{FR} + SD_{RL}$ of the right front and the left rear wheels and the sum $SD_{FL} + SD_{RR}$ of the left front and the right rear wheels. When the value $\Delta SD$ exceeds a set allowable range, the controller 3 determines that there is an imbalance in the contact loads of the wheels due to an abnormality such as differences in the suspension stroke sensors, differences in the tire wear, or skewing of the vehicle body. As a consequence, the controller 3 operates to change the set reference vehicle heights $H_{FLO}$, $H_{FRO}$, $H_{RLO}$ and $H_{RRO}$ for the left front, right front, left rear and right rear wheels, whereby each suspension unit is controlled (oil charging and discharging control) to agree with the changed reference vehicle height.

More specifically, when $\Delta SD$ is positive and exceeds a set allowable range L, the controller 3, as indicated in FIG. 7, (A') increases the set reference vehicle height for the right front wheel by $\Delta H(H_{FRO} \rightarrow H_{FRO} + \Delta H)$, (B') decreases the set reference vehicle height for the left front wheel by $\Delta H(H_{FLO} \rightarrow H_{FLO} - \Delta H)$, (C') decreases the set reference vehicle height for the right rear wheel by $\Delta H(H_{RRO} \rightarrow H_{RRO} - \Delta H)$, and (D') increases the set reference vehicle height for the left rear wheel by $\Delta H(H_{RLO} \rightarrow H_{RLO} + \Delta H)$.

Any two or four operations of the above (A'), (B'), (C') and (D') are performed simultaneously.

If the value $\Delta SD$ is negative and exceeds the set allowable range L, the controller 3, as indicated in FIG. 7, (a') decreases the set reference vehicle height for the right front wheel by $\Delta H(H_{FRO} \rightarrow H_{FRO} - \Delta H)$, (b') increases the set reference vehicle height for the left front wheel by $\Delta H(H_{FLO} \rightarrow H_{FLO} + \Delta H)$, (c') increases the set reference vehicle height for the right rear wheel by $\Delta H(H_{RRO} \rightarrow H_{RRO} + \Delta H)$, and (d') decreases the set reference vehicle height for the left rear wheel by $\Delta H(H_{RLO} \rightarrow H_{RLO} - \Delta H)$.

Any two or four operations of the above (a'), (b'), (c') and (d') are performed simultaneously. The value $\Delta H$ is set to a minimum resolution unit, which is in the order of several millimeters.

When the set reference vehicle height is changed for compensation as described above, oil charging and/or discharging are coordinated with the changed reference vehicle height, and as a result, the suspension units of the wheel with the larger contact load is contracted by the value $\Delta H$ and the suspension units of the wheel with the smaller contact load is extended by the value $\Delta H$ so that the imbalance of the contact loads is reduced.

The change of the reference vehicle heights is repeated for every time period $T_H$ (which is approximately the time required for one vehicle height adjustment) so that the value ΔSD falls in the set allowable range L, and then the changing operation for the reference vehicle height terminates, whereby unnecessary rocking or tilting of the vehicle is eliminated.

By the method described above, when there are a skew of the vehicle, differences in the frictions of the tires, sensor failure due to deformation of the sensor links, and similar abnormalities that result in an imbalance in the tire contact loads as expressed by the springs S in FIG. 3, such imbalance is adjusted within a short time, whereby no tilting of the vehicle occurs while running. Furthermore, the consumption of unnecessary energy due to repeating the vehicle height adjustment is eliminated along with other problems encountered in the conventional method.

The second embodiment described above is not limited to the vehicle height control system shown in FIG. 2, but can also be applied to a vehicle height adjusting system that detects the stroke of the suspension units of the four wheels and performs the vehicle height adjustment independently for each suspension unit so that the reference vehicle height is maintained responsive to the information of each suspension unit.

Figure 8:
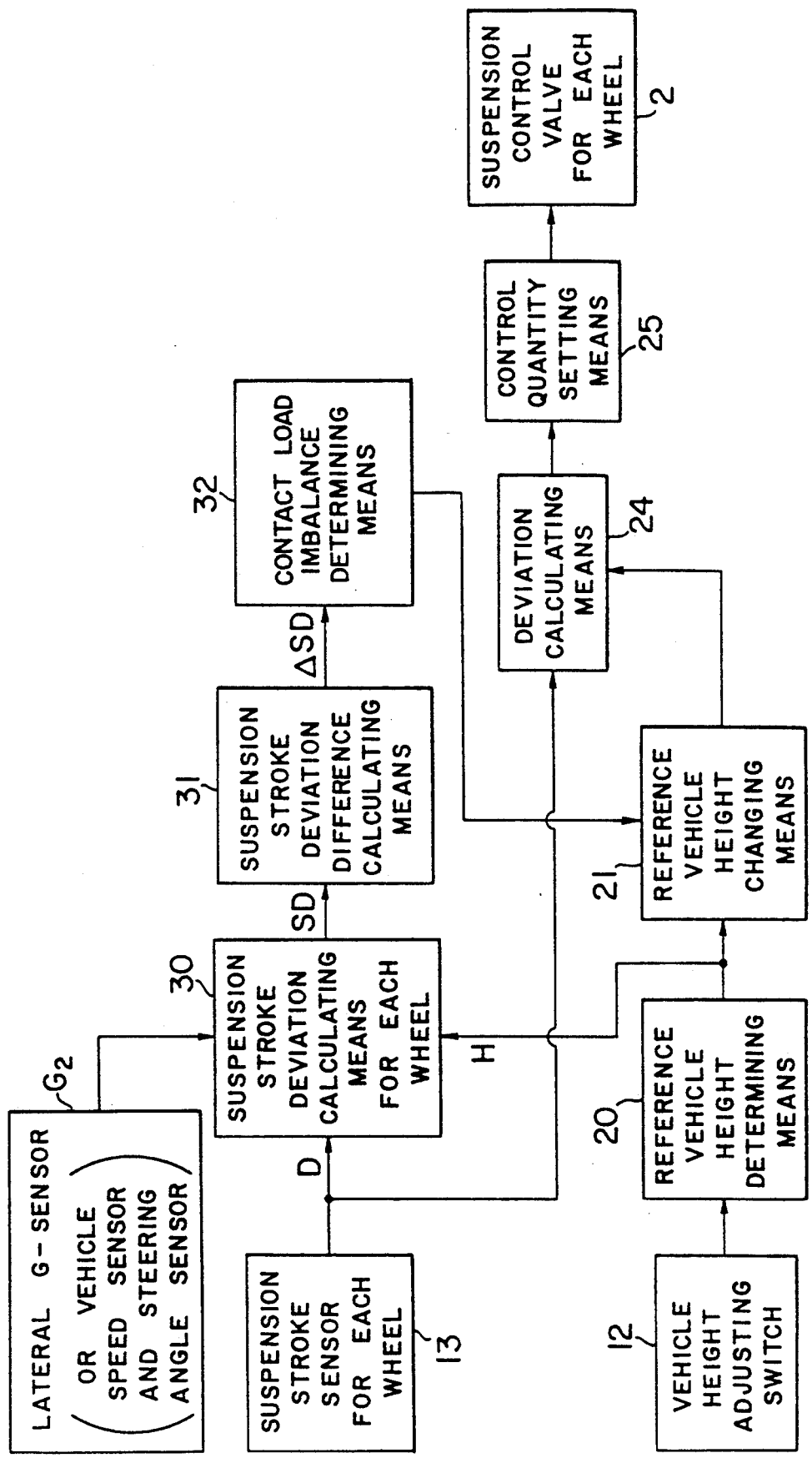
FIG. 8 is a block diagram showing an apparatus according to the second embodiment.

FIG. 8 is a block diagram of an apparatus for controlling the vehicle height described above. As shown, a vehicle height adjusting switch 12 is connected to a reference vehicle height determining means 20, which determines the reference vehicle height in response to the operation of the switch 12. The reference vehicle height determining means 20 supplies a reference vehicle height signal to a reference vehicle height changing means 21.

The suspension stroke sensor 13 for each wheel delivers a suspension stroke signal D to a suspension stroke deviation calculating means 30 for each wheel. A reference vehicle height signal H is supplied to the stroke deviation calculating means 30, where the values of the signal H and the signal D are compared and the difference ΔD is calculated. The stroke deviation calculating means 30 is operated responsive to a signal from the lateral G sensor $G_2$, indicating the vehicle is driven straight or stationary. It will be understood that the suspension stroke deviation calculating means 30 is provided for each wheel.

The calculating means 30 computes a difference ΔD for each suspension unit. In the calculating means 30, the absolute value |ΔD| is integrated with respect to time for a predetermined time $T_O$ to obtain the SD.

The thus calculated values SD for the respective suspension unit are supplied to a suspension stroke deviation difference calculating means 31, where the value ΔSD is calculated according to the formula $$\Delta SD = (SD_{FR} + SD_{RL}) - (SD_{FL} + SD_{RR})$$

and the value ΔSD is input to a contact load imbalance determining means to determine the imbalance state of the contact load by comparing the value ΔSD with the allowable range L. Resulting signal of the determining means 32 is input to the reference vehicle height changing means 21 where the reference vehicle height H is changed as indicated in (A′)(B′)(C′)(D′) and (a′)(b′)(c′)(d′) set forth before.

The reference vehicle height changing means 21 supplies the signal of each changed reference height to a deviation calculating means 24, where each changed reference height signal and the suspension stroke signal from the sensor 13 are compared to obtain an output signal to the control quantity setting means 25 for each control valve 2.

It will be understood from the foregoing description that the present invention has provided methods and apparatus capable of controlling the heights of the suspensions so as to maintain a good balance in which the contact loads of the wheels are equalized.

While the presently preferred embodiments of the present invention have been shown and described, it is to be understood that the disclosure is for the purpose of illustration and that various changes and modifications may be made without departing from the scope of the invention as set forth in the appended claims.

What is claimed is:

1. A method for controlling the height of a vehicle having vehicle height adjusting means, wherein suspension strokes of wheel suspension units are detected and the heights of said wheel suspension units are controlled in response to the detected suspension strokes of each unit so as to attain respective reference vehicle height, independently, said method comprising the steps of:

judging that the vehicle is either moving straight forward or is stationary;

calculating an imbalance amount representing the degree of imbalance among actual contact loads of all the wheels on a ground surface when the vehicle is stationary or is moving straight;

determining whether said imbalance amount exceeds a predetermined value; and changing said reference vehicle heights for at least two of said suspension units when said imbalance amount exceeds said predetermined value, the vehicle height adjusting means independently controls each of said suspension units based on the changed reference vehicle heigth.

2. The method as claimed in claim 1, wherein said imbalance amount is calculated based on suspension reaction forces of said respective suspension units.

3. The method as claimed in claim 2, wherein said imbalance amount is calculated according to the formula $$\Delta P = (\overline{P_{FR}} + \overline{P_{RL}}) - (\overline{P_{FL}} + \overline{P_{RR}})$$

where ΔP is said imbalance amount; $P_{FR}$, a quantity representing the reaction force of the right front wheel; $P_{RL}$, a quantity representing the reaction force of the left rear wheel; $P_{FL}$, a quantity representing the reaction force of the left front wheel; and $P_{RR}$, a quantity representing the reaction force of the right rear wheel.

4. The method as claimed in claim 2, wherein said imbalance amount is calculated according to the formula $$\Delta P = (\overline{P_{FR}} \div \overline{P_{FL}}) - (\overline{P_{RR}} \div \overline{P_{RL}})$$

where ΔP is said imbalance amount; $P_{FR}$, a quantity representing the reaction force of the right front wheel; $P_{FL}$, a quantity representing the reaction force of the left front wheel; $P_{RR}$, a quantity representing the reaction force of the right rear wheel; and $P_{RL}$, a quantity representing the reaction force of the left rear wheel.

5. The method as claimed in claim 2, wherein said imbalance amount is calculated according to the formula $$\Delta P = (\overline{P_{FR}} \div \overline{P_{RR}}) - (\overline{P_{FL}} \div \overline{P_{RL}})$$

where ΔP is said imbalance amount; $P_{FR}$, a quantity representing the reaction force of the right front wheel; $P_{RR}$, a quantity representing the reaction force of the left front where; $P_{FL}$, a quantity representing the reaction force of the right rear wheel; and $P_{RL}$, a quantity representing the reaction force of the left rear wheel.

6. The method as claimed in claim 1, wherein said imbalance is calculated based on said detected suspension strokes of the respective suspension units.

7. The method as claimed in claim 6, wherein the step of calculating comprises the steps of:
 calculating for each suspension unit an absolute value of a deviation of each detected suspension stroke from the reference vehicle height; and
 integrating said absolute value with respect to time through a predetermined length of time for each suspension unit; and
 calculating said imbalance amount based on integrated values of all the suspension units.

8. The method as claimed in claim 7, wherein said imbalance amount is calculated according to the formula $$\Delta SD = (SD_{FR} + SD_{RL}) - (SD_{FL} + SD_{RR})$$

where ΔSD is said imbalance amount; $SD_{FR}$, an integrated value for the right front wheel; $SD_{RL}$, an integrated value for the left rear wheel; $SD_{FL}$, an integrated value for the left front wheel; and $SD_{RR}$, an integrated value for the right rear wheel.

9. The method as claimed in claim 1, wherein when lateral acceleration is zero the vehicle is judged to be in a state of moving straight forward or stationary.

10. An apparatus for controlling the height of a vehicle having vehicle height adjusting means for each of front and rear wheels and a controller responsive to suspension strokes of wheel suspension units for independently controlling the heights of said wheel suspension units so as to attain respective reference vehicle height, said apparatus comprising:
 detecting means for detecting suspension strokes of each of said suspension units;
 calculating means responsive to said suspension strokes for calculating an imbalance amount representing the degree of imbalance among actual contact loads of all the wheels on a ground surface when the vehicle is stationary or is moving straight;
 imbalance determining means for comparing said imbalance amount with a predetermined value and for determining whether said imbalance amount exceeds said predetermined value; and
 reference vehicle height changing means for changing said reference vehicle heights for at least two of said suspension units when said imbalance amount exceeds said predetermined value, said vehicle height adjusting means independently controlling each of said suspension units based on the changed reference vehicle height, thereby maintaining a balance even when there is a vehicle distortion.

11. The apparatus as claimed in claim 10, wherein said detecting means are suspension reaction force detectors for detecting suspension reaction forces of the respective suspension units as said physical values.

12. The apparatus as claimed in claim 11, wherein said calculating means is adapted to carry out a calculation according to the formula $$\Delta P = (\overline{P_{FR} + P_{RL}}) - (\overline{P_{FL} + P_{RR}})$$

where ΔP is said imbalance amount; $P_{FR}$, a quantity representing the reaction force of the right front wheel; $P_{RL}$, a quantity representing the reaction force of the left rear wheel; $P_{FL}$, a quantity representing the reaction force of the left front wheel; and $P_{RR}$, a quantity representing the reaction force of the right rear wheel.

13. The apparatus as claimed in claim 11, wherein said calculating means is adpated to carry out a calculation according to the formula $$\Delta P = (\overline{P_{FR} \div P_{FL}}) - (\overline{P_{RR} \div P_{RL}})$$

where ΔP is said imbalance amount; $P_{FR}$, a quantity representing the reaction force of the right front where; $P_{FL}$, a quantity representing the reaction force of the left front wheel; $P_{RR}$, a quantity representing the reaction force of the right rear wheel; and $P_{RL}$, a quantity representing the reaction force of the left rear wheel.

14. The apparatus as claimed in claim 11, wherein said calculating means is adapted to carry out a calculation according to the formula $$\Delta P = (\overline{P_{FR} \div P_{RR}}) - (\overline{P_{FL} \div P_{RL}})$$

where ΔP is said imbalance amount; $P_{FR}$, a quantity representing the reaction force of the right front wheel; $P_{RR}$, a quantity representing the reaction force of the left font wheel; $P_{FL}$, a quantity representing the reaction force of the right rear wheel; and $P_{RL}$, a quantity representing the reaction force of the left rear wheel.

15. The apparatus as claimed in claim 10, wherein said detecting means are suspension stroke sensors for detecting suspension strokes of the respective suspension units as said physical values.

16. The apparatus as claimed in claim 15, wherein said calculating means comprises:
 suspension stroke deviation calculating means for calculating for each suspension unit as absolute value of a deviation of each detected suspension stroke from the reference vehicle height, and for integrating said absolute value with respect to time through a predetermined length of time for each suspension unit so as to produce an integrated value; and
 suspension stroke deviation difference calculating means for calculating said imbalance amount based on integrated values of all the suspension units.

17. The method as claimed in claim 10, wherein said calculating means is adapted carry out a calculation according to the formula $$\Delta SD = (SD_{FR} + SD_{RL}) - (SD_{FL} + SD_{RR})$$

where ΔSD is said imbalance amount; $SD_{FR}$, an integrated value for the right front wheel; $SD_{RL}$, an integrated value for the left rear wheel; $SD_{FL}$, an integrated value for the left front wheel; and $SD_{RR}$, an integrated value for the right rear wheel.

18. The apparatus as claimed in claim 10, wherein said changing means increases the reference vehicle heights for two of the suspension units and decreases the reference vehicle heights for the other two of the suspension units.

19. An apparatus for controlling the height of a motor vehicle having suspension units each provided between each wheel and a vehicle body for maintaining the body at an optimum attitude for driving in any conditions, hydraulic circuit means mounted on the motor vehicle for charging and discharging a hydraulic fluid to and from each suspension unit to change the suspension stroke of each suspension unit so as to change vehicle height, vehicle height adjusting means for selecting a reference vehicle height and for generating a reference vehicle height signal for the suspension units, a suspension stroke sensor attached to each suspension unit for detecting the suspension stroke and for producing a stroke signal, and control means responsive to said reference vehicle height signal and said stroke signal from each suspension stroke sensor, for operating the hydraulic circuit means to control the vehicle height, said apparatus comprising;

- judging means for judging that the vehicle is moving straight forward or stationary;
- detecting means for detecting suspension strokes for the respective suspension units;
- suspension stroke deviation calculating means for calculating for each suspension unit a deviation between the detected suspension stroke and a reference vehicle height when the vehicle is moving straight forward or stationary, and for integrating an absolute value of said deviation with respect to time through a predetermined length of time for each suspension unit so as to produce an integrated value; and
- suspension stroke deviation difference calculating means for calculating a suspension stroke deviation difference representing the degree of an imbalance among actual contact loads of each of the wheels on a ground surface on the basis of integrated values of all the suspension units when the vehicle is stationary or is driving straight;
- contact load imbalance determining means for comparing said suspension stroke deviation difference with a predetermined value; and
- reference vehicle height changing means for independently correcting said reference vehicle height for each suspension unit so as to maintain a balance of control loads of each of said wheels on the road surface when said difference exceeds said predetermined value.

* * * * *